W. GRAHAM.
Starch-Strainers.
No. 155,719. Patented Oct. 6, 1874.
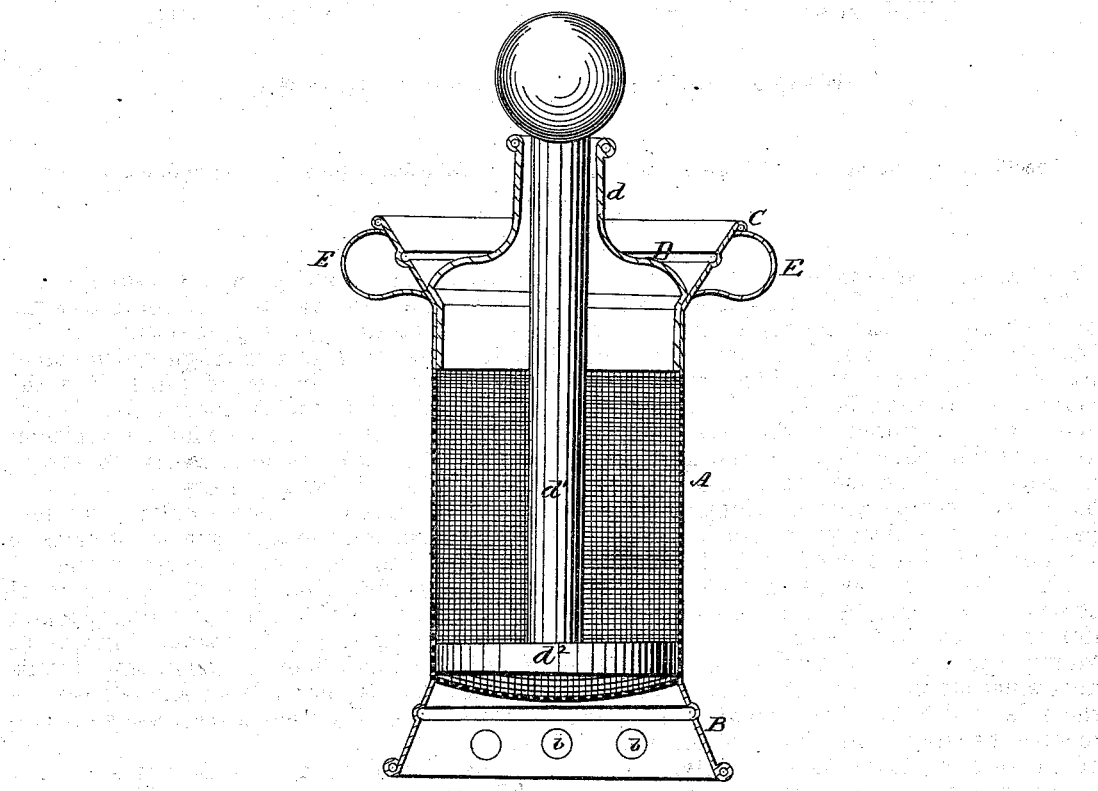

UNITED STATES PATENT OFFICE.

WILLIAMSON GRAHAM, OF ROCHESTER, PENNSYLVANIA.

IMPROVEMENT IN STARCH-STRAINERS.

Specification forming part of Letters Patent No. 155,719, dated October 6, 1874; application filed July 31, 1874.

*To all whom it may concern:*

Be it known that I, WILLIAMSON GRAHAM, of Rochester, in the county of Beaver and State of Pennsylvania, have invented a certain new and useful Starch-Strainer; and I do hereby declare the following to be a full, clear, and exact description of the invention, such as will enable others skilled in the art to which it pertains to make and use it, reference being had to the accompanying drawings, which form part of this specification, in which is shown a vertical central section of my invention.

This invention has relation to a starch-strainer; and consists in the novel construction of a perforated vessel or apparatus containing a plunger, and adapted to receive the unstrained starch and allow it to strain through the sides and bottom, the plunger being used to force the starch when its consistency is not of a nature to allow it to ooze freely.

Referring to the accompanying drawing, illustrating my invention, A designates a cylindrical vessel, the wall and bottom of which are made of minutely-perforated sheet metal, wire-gauze, or its equivalent. B designates a flaring rim encircling the bottom of the vessel, and forming a base or foot to support it in an upright position. $b$ $b$ are openings in said rim near the lower edge to allow the starch strained through the bottom to escape into the receiving-vessel, in which the strainer stands. C designates a flaring or funnel-shaped rim or flange encircling the mouth of the vessel for the purpose of enabling the starch to be poured in easily and without waste. D represents the lid of the strainer, having an opening in the center, with a neck, $d$, through which passes the stem $d^1$ of a plunger, of which $d^2$ is the disk, adapted to fit the strainer nicely. E represents handles or ears, by which the strainer may be lifted, and, when necessary, shaken to facilitate the straining process.

I am aware that strainers similar in the general construction and arrangement of parts to mine have been used for various purposes. I do not, therefore, claim, broadly, a cylindrical strainer provided with a reciprocating plunger, the same being shown, for instance, in Patent No. 63,090; but I limit myself to the details whereby my strainer is specially adapted to the straining of starch in a convenient manner.

What I claim as my invention is—

The starch-strainer consisting of the cylinder A, having a finely-perforated wall and bottom, and provided with the flaring mouth C, flaring perforated base B, lid D, plunger $d^2$, and ears E E, combined and arranged as shown and described.

In testimony that I claim the foregoing I have hereunto set my hand this 29th day of July, 1874.

WILLIAMSON GRAHAM.

Witnesses:
    THOS. A. CONNOLLY,
    JOS. B. CONNOLLY.